US010129298B2

(12) United States Patent
Grady et al.

(10) Patent No.: US 10,129,298 B2
(45) Date of Patent: Nov. 13, 2018

(54) DETECTING ATTACKS USING COMPROMISED CREDENTIALS VIA INTERNAL NETWORK MONITORING

(71) Applicant: Microsoft Technology Licensing, LLC., Redmond, WA (US)

(72) Inventors: Itai Grady, Ramat Hasharon (IL); Michael Dubinsky, Tel Aviv (IL); Benny Lakunishok, Holon (IL); Idan Plotnik, Savion (IL); Tal Arieh Be'ery, Petach Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 15/199,880

(22) Filed: Jun. 30, 2016

(65) Prior Publication Data

US 2018/0007087 A1      Jan. 4, 2018

(51) Int. Cl.
*H04L 29/06* (2006.01)
*G06F 21/31* (2013.01)
(Continued)

(52) U.S. Cl.
CPC .......... *H04L 63/1466* (2013.01); *G06F 21/31* (2013.01); *G06F 21/45* (2013.01);
(Continued)

(58) Field of Classification Search
None
See application file for complete search history.

(56) References Cited

U.S. PATENT DOCUMENTS 7,890,612 B2   2/2011  Todd et al.
8,640,231 B2   1/2014  Florencio et al.
(Continued)

FOREIGN PATENT DOCUMENTS

WO     2005125084 A1     12/2005

OTHER PUBLICATIONS

"PwnedList", Published on: Jul. 2, 2014 Available at: https://pwnedlist.com/services.
(Continued)

*Primary Examiner* — David Le
(74) *Attorney, Agent, or Firm* — Merchant & Gould

(57) ABSTRACT

The threat of malicious parties exposing users' credentials from one system and applying the exposed credentials to a different system to gain unauthorized access is addressed in the present disclosure by systems and methods to preemptively and reactively mitigate the risk of users reusing passwords between systems. A security device passively monitors traffic comprising authorization requests within a network to reactively identify an ongoing attack based on its use of exposed credentials in the authorization request and identifies accounts that are vulnerable to attacks using exposed credentials by actively attempting to log into those accounts with exposed passwords from other networks. The systems and methods reduce the number of false positives associated with attack identification and strengthens the network against potential attacks, thus improving the network's security and reducing the amount of resources needed to securely manage the network.

18 Claims, 8 Drawing Sheets

(51) Int. Cl.
*G06F 21/45* (2013.01)
*G06F 21/55* (2013.01)

(52) U.S. Cl.
CPC ........ *G06F 21/554* (2013.01); *H04L 63/0428* (2013.01); *H04L 63/083* (2013.01); *H04L 63/101* (2013.01); *H04L 63/1408* (2013.01); *H04L 63/1433* (2013.01); *G06F 2221/2151* (2013.01)

(56) References Cited

U.S. PATENT DOCUMENTS

| | | | |
|---|---|---|---|
| 8,782,796 | B2 | 7/2014 | Hawthorn et al. |
| 8,973,142 | B2 | 3/2015 | Shulman et al. |
| 9,077,747 | B1 | 7/2015 | Chen et al. |
| 2001/0020243 | A1* | 9/2001 | Koppolu ........... G06F 17/30855 715/205 |
| 2005/0157662 | A1 | 7/2005 | Bingham et al. |
| 2007/0130463 | A1* | 6/2007 | Law ........................ G06F 21/34 713/168 |
| 2011/0126024 | A1* | 5/2011 | Beatson .................. G06F 21/32 713/186 |
| 2013/0117824 | A1 | 5/2013 | Naslund et al. |
| 2014/0331063 | A1* | 11/2014 | Hayton ................... G06F 21/46 713/193 |
| 2015/0288709 | A1 | 10/2015 | Singhal et al. |
| 2016/0226862 | A1* | 8/2016 | Song ..................... H04W 4/008 |

OTHER PUBLICATIONS

Donohue, Brian, "Threat post", Published on: Sep. 17, 2012 Available at: https://threatpost.com/pwnedlist-partnership-provides-credential-monitoring-lastpass-users-091712/77016/.

Beier, Christopher, "Stolen Password? How to Not Be the Next Victim of Corporate Password Theft", Published on: Aug. 13, 2014 Available at: https://securityintelligence.com/stolen-password-how-to-not-be-the-next-victim-of-corporate-password-theft/.

Kerner, Sean Michael, "Sentry MBA Uses Credential Stuffing to Hack Sites", Published on: Mar. 9, 2016 Available at: http://www.eweek.com/security/sentry-mba-uses-credential-stuffing-to-hack-sites.html.

"Protecting corporate credentials against today's threat", In White Paper of IBM, Sep. 2014, pp. 1-8.

"International Search Report and Written Opinion Issued in PCT Application No. PCT/US2017/039352", dated Oct. 10, 2017, 14 Pages.

\* cited by examiner

180

| | | |
|---|---|---|
| AAARONS | PassWord1 | Contoso.com |
| ABAKER | abc12345ABC | Contoso.com |
| ACHARLES | openSesam3 | Contoso.com |
| ADONALDSON | s3cVr3 | Contoso.com |
| AEDWARDS | password123A | Contoso.com |
| AFREDRICHS | passPASS1 | Contoso.com |
| AHARROLD | letMEin123 | Contoso.com |
| AIPSTEIN | Admin123 | Contoso.com |
| AJOHNSON | 123passworD | Contoso.com |
| AKINGSTON | word123PASS | Contoso.com |
| ALIVINGSTON | Correcthorsebattery12 | Contoso.com |
| AMICHAELS | Op3nsesame | Contoso.com |
| ANOBOKOV | linkSYS7 | Contoso.com |
| AOMARY | lwp4C[a3b | Contoso.com |
| APETERS1 | dkfsdp3Cmj | Contoso.com |
| APETERS2 | birthDay45 | Contoso.com |
| AROBERTS | contosoPass1 | Contoso.com |
| AROBERTSON | passW0rd | Contoso.com |
| ASIERRA | dontFORGET7 | Contoso.com |
| ATHOMPSON | 54321paSS | Contoso.com |

FIG. 1B

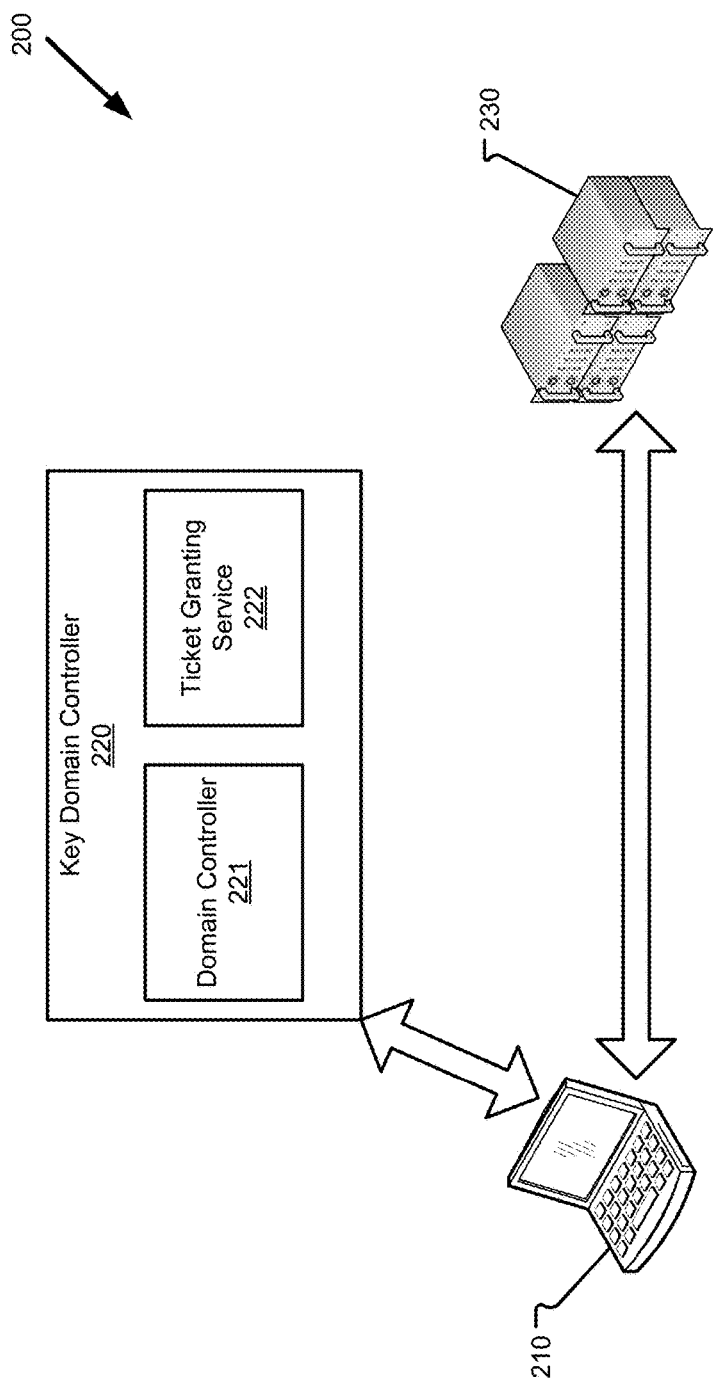

DETECTING ATTACKS USING COMPROMISED CREDENTIALS VIA INTERNAL NETWORK MONITORING

BACKGROUND

When a malicious party has gained access to a first system they will often exploit the legitimate users' poor security practices to gain access to additional systems. For example, a user may use a password in a social media system and reuse that password on a work system, thus allowing the malicious party access to both systems once one is compromised if the malicious party can link the user's account names on the two systems. Lists of user credentials (usernames, passwords, domains, etc.) are hosted by malicious parties for sale to one another and may be used to gain access to systems directly, build password dictionaries, or provide a starting point for a targeted brute force attack (e.g., when a user varies a password by incrementing a digit: password1, password2, password3, etc.).

Administrators of networks often set operational security policies that suggest or require users to use passwords different than those used in other systems, to frequently change passwords, and to not reuse passwords within their networks, but their networks are still subject to attacks that use these compromised credentials due to users ignoring, forgetting, or skirting these policies. Even when individual users are not vulnerable to these attacks, due to following good operational security policies, the network itself has to deal with these attacks due to malicious parties testing the network for vulnerabilities due to poorly chosen or exposed credentials, which may be indistinguishable from benign login errors (e.g., when a legitimate user mis-enters a password or forgets to update a password in a system that automatically attempts to login to the network).

To combat attacks, administrators need to identify a set of one or more login attempts as malicious and take action to secure the network, which may include locking an account, restricting access from an account, blocking a port, applying an Access Control List (ACL) (e.g., a whitelist or a blacklist for sets of IP addresses), flagging an account for manual review, etc. Identifying an attack as malicious and securing a network can require a significant expenditure of human and computing resources, and may result in false positives; requiring additional human and computing resources to undo the security actions. If false positives are returned too frequently, it eventually leads to weakened security for the network due to users bypassing security and ignoring good security practices out of frustration.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for protecting a first network from credentials exposed from a second network via internal network monitoring. The systems and methods of the present disclosure are operable to determine whether a login attempt is part of an attack based on knowledge of compromised credentials from third-party systems and monitoring of the internal network. A security device is deployed in the network to monitor the traversing authentication traffic and to use an intelligence feed 180, comprising compromised credentials used by malicious parties, to identify authentication traffic sent as part of an attack and to determine when users' credentials are vulnerable to attack and should therefore be updated.

By providing administrators with the ability to more readily identify attacks and users whose credentials are vulnerable to an attack before an actual attack is initiated, the present disclosure addresses a computer-centric problem and improves the efficiency, reliability, and security of the systems themselves.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIG. 1B illustrates an example intelligence feed;

FIG. 2 illustrates an example authentication protocol execution;

DETAILED DESCRIPTION

Figure 1A:
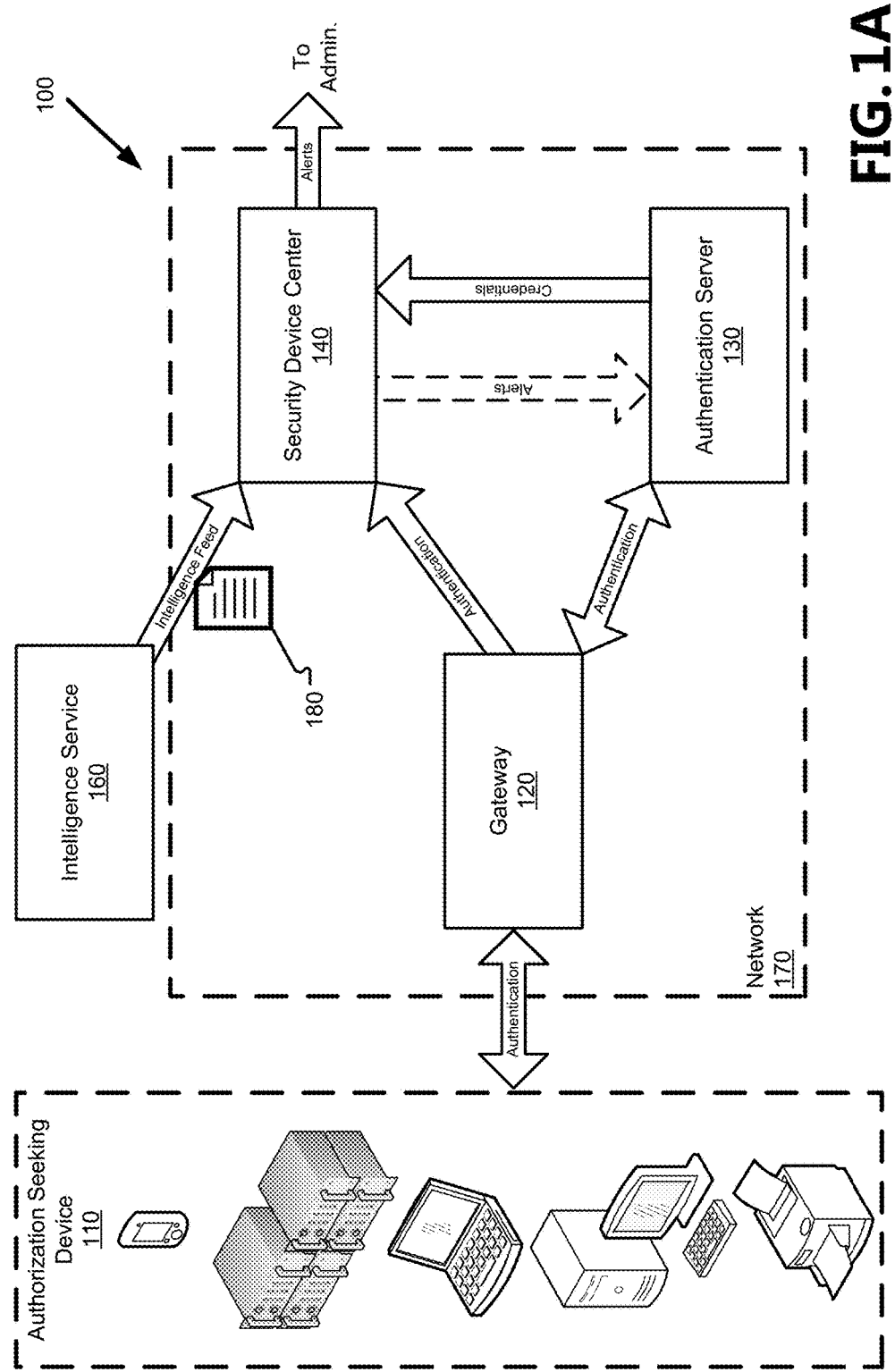
FIG. 1A illustrates an example environment in which authorization requests are handled by a system from various requesting devices.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

A brute force attack attempts to gain access to an account hosted by a system by trying several different passwords in succession until access is gained, while a targeted attack (which may built into a brute force attack as a first attempt) uses a known or suspected set of credentials to gain unauthorized access. To increase the odds of a correct password being tried before a system implements security measures, malicious parties may use password dictionaries or targeted passwords to increase their odds of finding a correct password for an account. Password dictionaries are comprised of known-good passwords from the compromised credentials of several users and may rank those passwords based on frequency so that the most popular known-good passwords are tried earlier in an attack than less popular known-good or random passwords. A targeted password is a password based on compromised credentials from a third-party system that the malicious party links (or attempts to link) to an account on the system being attacked. For example, if a malicious party learns that username "johndoe123" uses the password of "password1" for access to the first domain of "domainA.com", the malicious party may search for a username for the same person on a second domain of "domainB.com" and will use the password from "domainA.com" as the basis of a targeted password. The malicious party may try the basis password and variations thereof (e.g., "password", "password2", "PASSWORD1") as a targeted password in a vertical brute force attack against one account, may attempt the targeted password in a horizontal brute force attack against several suspected accounts hosted in the second domain (e.g., "johndoe123", "johndoe", "doe.john"), or may attempt a vertical and horizontal brute force attack; trying several passwords against several known or suspected account names in the domain. Because users often reuse passwords between domains, a targeted password from a compromised domain may be used to gain access to a domain that has not yet been compromised.

A security device is therefore provided that uses knowledge of a credential set (e.g., targeted pairs of usernames and passwords) to monitor for authorization attempts that include compromised credentials and can alert users when their credentials are vulnerable to attack via a targeted password. By providing administrators with the ability to more readily identify attacks and vulnerable users, the present disclosure addresses a computer-centric problem and improves the efficiency and reliability of the systems themselves that are involved in the granting and receiving of authorization.

Messages carrying authorization requests (e.g., login attempts), as a good security practice, should not contain a password (including text, biometric scans, voice print data, and other access-granting data) in plaintext, but instead should normally carry the password in an encrypted format. A security device that monitors network traffic may be used to passively determine whether a login attempt uses credentials that have been exposed from one or more other networks regardless of whether the username is valid for the given network and therefore indicates that an attack is underway. The security device is also operable to be used actively to test accounts to determine whether they are vulnerable to attack via exposed credentials and should therefore be secured against such an attack preemptively (or retroactively if clandestinely attacked before discovery). For security and maintenance purposes, the security device does not need to know the active password (which a user may periodically change). The security device may monitor the results of the authentication requests to provide users and administrators with greater security and reliability in detecting attacks that would otherwise go unnoticed.

FIG. 1A illustrates an example environment 100 in which authorization requests are handled by a system from various requesting devices. As illustrated, one or more authorization seeking devices (ASD) 110 attempt to gain access to accounts or physical/virtual machines (generally, accounts) hosted within the network 170. The ASD 110 connect to the network 170 via a gateway 120 which is in communication with the authentication server 130. The server 130 handles the authorization or rejection of login attempts carried in authentication traffic. An intelligence feed 180 is provided from an intelligence service 160 to the network 170 and is passed via the gateway 130 to a security device center (SDC) 140 which monitors the authorization traffic between the ASD 110 and the authentication server 130 to determine whether the traffic indicates an attack. In addition, the SDC 140 examines the authentication credentials for the network 170 to identify vulnerable accounts and to alert the authentication server 130 of an attack or vulnerable account. Although not illustrated, one of skill in the art will appreciate that various servers and intermediaries in a distributed network may lie between the ASD 110 and the gateway 120 to route a message between the user and the network 170. As will also be appreciated, although some components of the example environment 100 are illustrated singly, in various aspects multiple copies of those components may be deployed, for example, for load balancing purposes, redundancy, or offering multiple services.

The ASD 110 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, and 6B. In various aspects, the ASD 110 are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may control an ASD 110 directly or via a malicious program (e.g., a virus) over a network as part of a "bot-net" to perform the brute force attack from a plurality of ASD 110 which may be done without the knowledge or consent of the devices' owners. In another example, an ASD 110 may be the computing devices used by a legitimate user seeking to access an account which may make one or more attempts to access the account.

The gateway 120 is a hardware device, such as a network switch, or a software service that links the ASD 110 from the external network (e.g., the Internet) to the authentication server 130 over the network 170 (e.g., an intranet). In various aspects, the gateway device 120 may provide a firewall and may regulate the flow of communications traffic into and out of the local network 170. In some aspects, the gateway 120 forwards messages to the authentication server 130 from the ASD 110 (as well as other devices on the internal network) and may mirror ports so that messages destined for the authentication server 130 are also forwarded to the SDC 140. The gateway 120 also forwards messages from the authentication server 130 to the ASD 110 and handles communications from the intelligence service 160. In other aspects, the gateway 120 is a device that passively eavesdrops on network traffic flowing through the device for authentications, and consumes (rather than proxies) the authentications. Although not illustrated, in optional aspects the SDC 140 may communicate back to the intelligence server 160 in which case those communications are also forwarded by the gateway 120.

The authentication server 130 receives authorization requests from the ASD 110 and determines whether to grant access to accounts served by the network 170. In various aspects, the authentication server 130 may be a physical machine or a VM that handles the authentication requests for the network 170 and acts as a domain controller. The authentication server 130 may use various authentication protocols including, but not limited to, PAP (Password Authentication Protocol), CHAP (Challenge-Handshake Authentication Protocol), EAP (Extensible Authentication Protocol), Kerberos, or an AAA (Authentication, Authorization, Accounting) architecture protocol, to allow a user access to one or more systems within a network 170. An example interaction according to an authentication protocol is discussed in greater detail in regard to FIG. 2. Depending on the standards used, the number of protected systems in the network 170 and user account settings, the successful presentation of authentication parameters will grant the ASD 110 access to one or more systems safeguarded by the authentication server 130 and at an appropriate permissions level for the associated user.

The SDC 140 receives an intelligence feed 180 from the intelligence service 160 and credentials from the authentication server 130 to monitor authentication traffic over the gateway 120 destined for the authentication server 130 to thereby determine whether the communications represent an attack and whether the credentials are vulnerable to an attack. In some aspects, the SDC 140 is operated on a separate device with unique MAC and IP addresses from the other devices in the network 170 and receives copies of messages that are forwarded to the authentication server 130 from the gateway 120 via the Remote Network Monitoring (RMON) or Switch Monitoring (SMON) specifications, port mirroring, or similar forwarding scheme. In other aspects, the SDC 140 acts as a device that intercepts all network traffic bound for the authentication server 130 (either with the same MAC and IP address or unique addresses) and forwards the communications to the authentication server 130 or passively taps and listens to the transmission medium on which the communications are sent to the authentication server 130. In yet other aspects, the SDC 140 is operated as a virtual machine or process on the hardware device that provides the application server 130 and may thereby passively share communications received at the device addressed to the application server 130.

Figure 3:
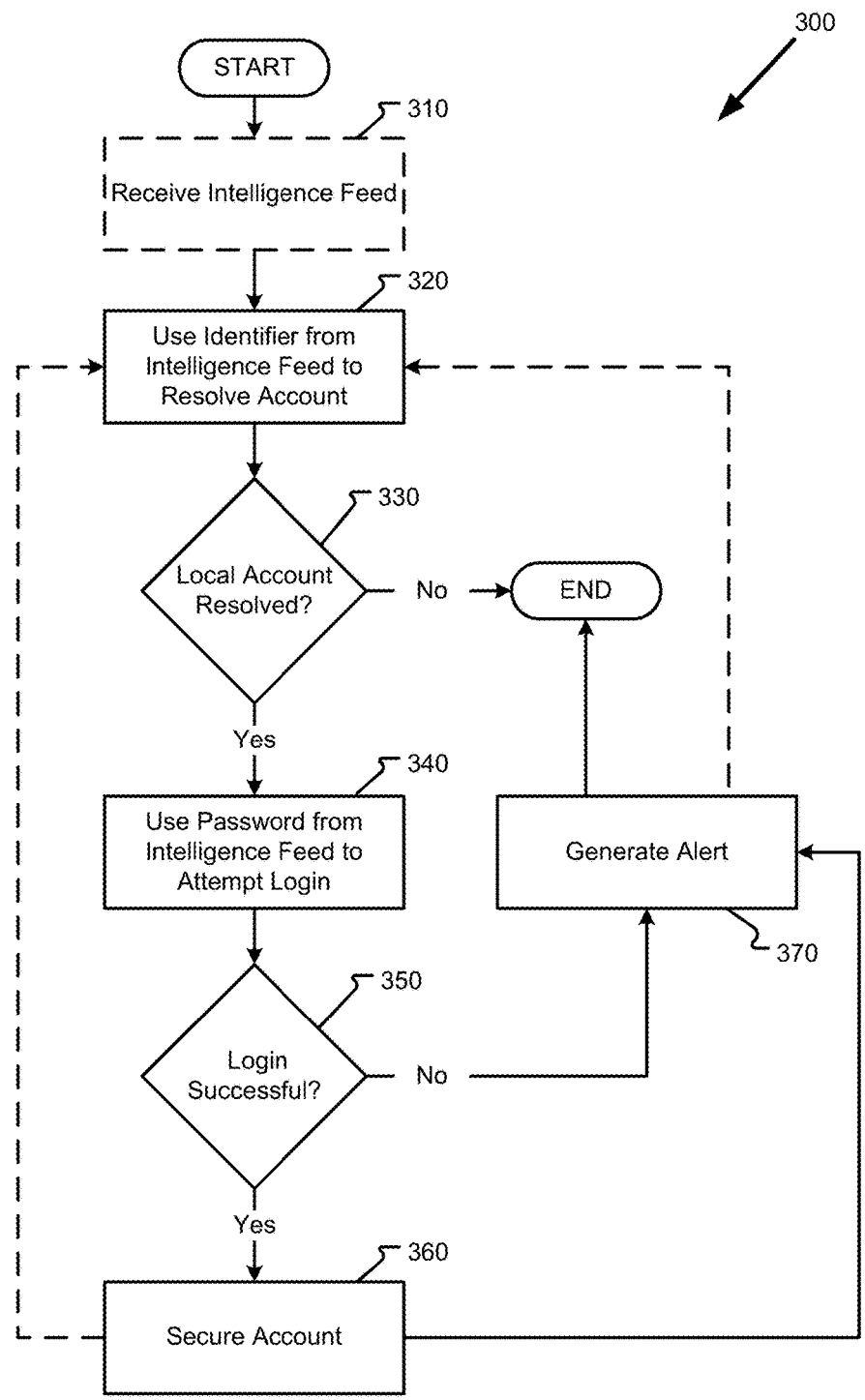
FIG. 3 is a flowchart showing general stages involved in an example method for actively verifying user credentials to safeguard vulnerable accounts.
Figure 4:
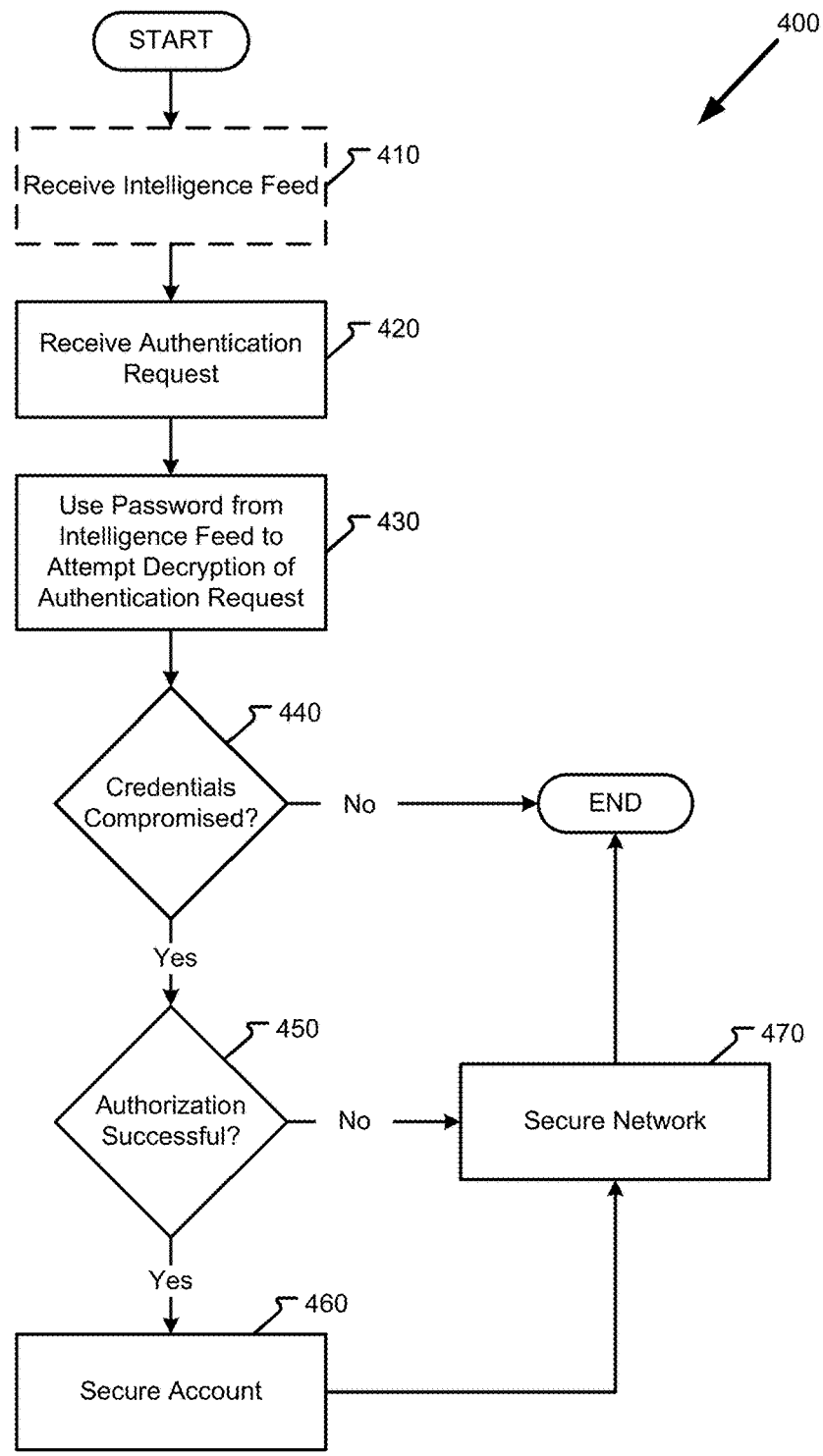
FIG. 4 is a flowchart showing general stages involved in an example method for passively verifying user credentials to identify an attack using exposed credentials.

The SDC 140 will perform one or more of the methods discussed in greater detail in regard to FIGS. 3 and 4 to determine whether login attempts constitute part of an attack or whether one or more accounts are vulnerable to a targeted password attack and will communicate the determination to administrative personnel for the network 170 and optionally the authentication server 130 to either secure the account/network or leave the account/network in its normal operational mode (or remove an active security precaution).

The intelligence service 160 is illustrated as a service external to the network 170 that provides an intelligence feed 180 for use by the SDC 140 to determine when exposed credentials affect the accounts of the network 170. In alternate aspects, an intelligence service 160 may be implemented internally to the network 170 to pull an intelligence feed 180 from an external source.

The intelligence feed 180 comprises a list of exposed credentials that the SDC 140 will use, in conjunction with the credentials for its network 170, to identify vulnerable accounts and ongoing attacks. For example, when domain A (e.g., a first website) has its passwords and usernames exposed in a data breach, those credentials may be collected by the intelligence service 160 and passed to domain B (e.g., a second website) to guard against potential targeted password attacks. An example intelligence feed 180 is illustrated in FIG. 1B. As will be appreciated, credentials may be stored in a table or character delineated list in various aspects. The exposed credentials may be collected from the same sources used by malicious parties to post and/or sell exposed credentials, or they may be provided by the services affected by a data breach (e.g., website A from the above example may communicate the exposed credentials to the intelligence service 160). In various aspects, the intelligence feed 180 will include, but is not limited to: usernames, passwords, the names of the domains from which username/password pairs were exposed, secret questions and answers thereto (e.g., questions used to authorize a password reset when a user has forgotten a password), contact information (e.g., an email account used to register the username), secondary authentication contact information (e.g., a phone number used for multifactor authentication), profile information (e.g., posted names, locations, employer information, etc. from a social media website), the last n passwords used, etc., which may be used in conjunction with the present disclosure (e.g., testing for the exposed last n passwords used as well as the exposed current password).

In various aspects, the intelligence service 160 may provide the intelligence feed 180 on a push model or a pull model (or a combination of the two). In a push model, the intelligence service 160 may periodically send an intelligence feed 180 to the SDC 140 (e.g., every day, every week, every month) or may send an intelligence feed 180 whenever the intelligence server 160 learns of a new data breach or gathers additional exposed credentials. In a pull model, the SDC 140 may issue a request to the intelligences service 160 to transmit the intelligence feed 180 which the intelligence service 160 will respond to by transmitting an intelligence feed 180 or an indication that the SDC 140 already has the most up-to-date intelligence feed 180 (i.e., no changes have been made since the last transmittal). The intelligence feed 180 may be provided as a full listing or as an addendum; only transmitting newly-learned-of exposed credentials or indicating changes to an exposed credential list.

As will be appreciated, each domain may use various account names and may include other identifiers (which may be exposed in a data breach and therefore included in the intelligence feed 180) and which may differ between domains. For example, a user of the name "John Doe" may have an email address of "John.Doe.CEO@domainA.com", an internal domain name of "JDoe123", and a password of "passWord1" within Domain A, and have the email address of "jd_home@domainB.com" and a password of "Password2" within Domain B. If Domain B has its credentials exposed, a malicious party may try to log into Domain A using the exposed credentials by attempting to change a domain portion of an address from the credentials from Domain A to Domain B (e.g., trying to log in via "jd_home@domainA.com" and "Password2"). The SDC 140 will receive the malicious party's login attempt and may filter out authentication requests for email addresses that do not exist in the active domain, for example, an authentication request for "jd_home@domainA.com" may be filtered out from further processing if an email address for "jd_home" does not exist in Domain A, but an authentication request for "John.Doe.CEO", which does exist in Domain A may undergo further processing.

When a network 170 uses an intra-domain username for internal authentication, such as "JDoe123" from the above example, when the SDC 140 receives an email address or other extra-domain username, it will attempt to translate the extra-domain username into the intra-domain username. Because there is nothing beyond the conventions of a given organization that link extra-domain and intra-domain usernames for that organization, and because not all organizations use the same conventions in linking these usernames, for the SDC 140 to operate in multiple domains, it is operable to query an active directory to translate between the intra- and extra-domain names. The active directory may be managed as part of the authentication server 130 or as a separate machine used by the authentication server 130 to manage the network's 170 domain and the accounts therein. The SDC 140 may query the active directory of the authentication server 130 to determine if an account name (either extra- or intra-domain) supplied in an authentication request is served by the authentication server 130, and if it is determined that the username is valid for the authentication server 130 will then attempt to resolve the supplied username into an intra-domain username. In some aspects, the SDC 140 will query the active directory via an LDAP (Lightweight Data Access Protocol) or similar query for a specific domain or a GC (Global Catalog) or similar query for multiple domains within the active directory to resolve the supplied extra-domain username into an intra-domain username. For example, when an authentication request for Domain A supplies a username of "John.Doe.CEO@domainA.com", the SDC 140 will check whether this is a valid account served by the authentication server 130, and will then query the active directory to determine that Domain A employs a username internally of "JDoe123" for this account.

In further aspects, when the intelligence feed 180 includes additional identifying information or usernames (e.g., multifactor authentication, setup emails), the SDC 140 will also attempt to translate these usernames into its domain's usernames. For example, if John Doe registered as user "JD_9000" in Domain C and supplied his Domain A email of "John.Doe.CEO@domainA.com" when registering in Domain C, and if credentials from Domain C are exposed and communicated to the SDC 140 via an intelligence feed 180, the SDC 140 may attempt to match both "JD_9000@domainA.com" (adding the local domain name to the other domain's intra-domain username) and "John.Doe.CEO@domainA.com" (using the exposed registration email address and using/substituting Domain A as its domain) to its domain's usernames. Continuing the example, "JD_9000@domainA.com" would be filtered out if Domain A did not provide such an email, but "John.Doe.CEO@domainA.com" would be retained for further processing and would resolve to the intra-domain username of "JDoe123" for domain A.

When the SDC 140 resolves a username from the intelligence feed 180 into a username in its domain, the SDC 140 may actively attempt to gain access to the internal account using the exposed password credential from the intelligence feed 180 and may passively monitor authentication attempts for use of exposed credentials. Actively attempting to authenticate users via exposed passwords helps improve the security of the network 170 by securing the accounts of vulnerable users before an attack on that account is initiated or before an attack can be found by other methods if the account has been subject to a targeted attack. Passively reading authentication attempts allows for brute force attacks that may go unnoticed in a frequency- or volume-based detection scheme to be discovered. The authentication attempts in these brute force attacks may be for accounts that are served or not served by the network 170 and may be detected based on the usernames, passwords, or a username/password pair used in one or more authentication requests matching the credentials supplied in the intelligence feed 180.

In various aspects, a network 170 may opt in to report attack statistics back to an external intelligence service 160 to improve the security of additional networks. These reports may be sent periodically as batch reports to protect account anonymity that cover a set amount of time (e.g., daily, weekly, monthly) or a set number of authentication requests (e.g., batches of n authentication requests). The reports may include, but are not limited to, statistics related to: a percent or number of valid email addresses seen in authentication requests, a percent or number of valid passwords seen in authentication requests, or a percent or number of uniquely used invalid credentials. The batch reports may identify or may be linked by the intelligence service 160 to a given intelligence feed 180 or data breach that influenced an intelligence feed 180 so that additional precautions can be taken for a set of credentials that are known to be in use by malicious parties in attacks on active networks.

FIG. 2 illustrates an example authentication protocol execution 200. Various authentication protocols may allow a Single Sign On (SSO) experience where users actively authenticate (i.e., provide a password) only once even though accessing multiple services or accessing a single service via different sessions (e.g., closing and reopening a program used to access the service), or may require reauthentication each time the user attempts to access the service.

The Kerberos protocol, for instance, allows an SSO experience, where a user supplies a domain name, account name, and a password to access a local computing device 210 (which may also be an ASD 110) and subsequently one or more network services 230 (e.g., an email service, a document management system, a VM). The computing device 210 will authenticate the credentials supplied by the user with a Key Domain Controller (KDC) 220 by sending a timestamp (of the current time of the authentication request) to the KDC 220 that is encrypted with a key derived from the user's password. The KDC 220 will verify the user's identity by decrypting the message with its copy of the user's password-derived key, stored on the authentication server 130, and by verifying that the timestamp is relevant (e.g., the unencrypted time is possible, given potential network latency, to match a time of a login request). If the timestamp is relevant, the KDC 220 will transmit a Ticket Granting Ticket (TGT) to the computing device 210 which is an identifier that enables the computing device 210 to request access to network services 230 without having to re-supply the user's credentials (e.g., domain name, account name, password).

Once a TGT has been granted to the user on the computing device 210, and until the TGT expires, each time the computing device 210 attempts to access a network service 230, it will identify itself to a domain controller 221 (residing in the KDC 220) with the TGT. The domain controller 221, through a ticket granting service 222, will provide the computing device with the access ticket for the particular network service 230 that the user is attempting to contact. The user will then, via the computing device 210, provide the access ticket to the network service 230. The network service 230, because the access ticket has been validated by the ticket granting service 222, will authorize the user's access, and a connection between the computing device 210 and the network service 230 is established without the user needing to re-input credentials.

The NTLM (Networked LAN Management) Protocol is another authentication protocol which uses credentials of a domain name, an account name, and a password (or a one-way hash thereof) to enable logons via a challenge/response model. Instead of sending the user's password between the computing device 210 and the network service 230 for which access is sought, the computing device 210 must perform a calculation that proves it has access to the secured credentials.

Under NTLM version one (NTLMv1), the network service 230 authenticates the user by sending an eight-byte random number as a challenge to the computing device 210. The computing device 210 will perform an operation using this eight-byte random number and a hash of the user's password. In various aspects, the user may also initiate a challenge to the network service 230. The user will return a 24-byte result (and optionally its own challenge) to the network service 230 which will verify whether the client has computed the correct result and should therefore be granted access to the network service 230.

In greater detail, a response to a challenge under NTLMv1 is calculated by deriving a 16-byte key from the user's password (the hash) which may be done according to the LM hash algorithm or the NT hash algorithm and which is then padded with null values to reach 21-bytes in size. The padded hash is then broken into thirds (seven-bytes) which are used to create three keys for the Data Encryption Standard (DES) algorithm. Each of the keys are then used to encrypt the challenge via DES (in electronic codebook mode) which results in three eight-byte cipher texts that are concatenated into the 24-byte response.

NTLM version two (NTLMv2) builds on NTLMv1 to provide additional security and strengthen NTLMv1 to employ a 128 bit key space wherein the term "key space" is understood to refer to the set of possible valid keys for a given encryption algorithm used by the protocol. NTLMv2 allows for the continued use of an existing domain controller from a previous NTLMv1 regime. NTLMv2 adds additional client challenges to a response which are hashed and transmitted to the network service 230 to grant or deny access to the user.

As will be appreciated, although the Kerberos and NTLM protocols were discussed in detail in regard to FIG. 2, other authentication protocols may be used, or variations to the presented protocols may be made. The protocols discussed in FIG. 2 are given as non-limiting examples to introduce the operations and terminologies involved in example aspects for authentication within the present disclosure. Other protocols using various encryption algorithms may be used without departing from the spirit and scope of the present disclosure.

FIG. 3 is a flowchart showing general stages involved in an example method 300 for actively verifying user credentials to safeguard vulnerable accounts independently of network traffic. Method 300 begins at OPERATION 310 where an intelligence feed 180 is received. The intelligence feed 180 includes credentials from a domain that have been exposed (e.g., in a data breach) and may be available to malicious parties for use in an attack. The credentials include one or more user identifiers (e.g., an email address, an account name, a personal name, a social security number) and an exposed password, but in various aspects may also include additional information (e.g., security questions and their answers). In some aspects, method 300 may be initiated in response to receiving an intelligence feed 180. In other aspects, however, method 300 may be initiated in response to a user updating a password or periodically (e.g., monthly, weekly) by the network 170, in which case method 300 may begin at OPERATION 320 and will use data from previously received intelligence feeds 180.

At OPERATION 320 an account identifier from the intelligence feed 180 is attempted to be resolved into a local account by the SDC 140 of a given domain. For example, if the packet for an authentication request includes an email address or a username as an account identifier, the SDC 140 may determine whether the email or username is present in an active directory of accounts served by the network 170. In some aspects, this determination may include a query to an active directory in the network 170 to match an extra-domain account identifier (e.g., an email address) to an intra-domain account identifier (e.g., an internal username).

Method 300 then proceeds to DECISION 330 where it is determined whether the identifier resolves into a local account. When the identifier does not resolve into a local account, method 300 may conclude. When the identifier does resolve into a local account, method 300 proceeds to OPERATION 340, where the exposed password received from the intelligence feed 180 is used to attempt a login to the authentication system 130 or a dummy copy thereof (e.g., a honeypot, a mirror).

In various aspects, the SDC 140 uses the exposed password from the intelligence feed 180 and, optionally, minor variations thereof at OPERATION 340 to attempt to gain access to the realized account. Minor variations may be set by an administrator to attempt a designated number of versions in a targeted internal brute force attack of the password. A targeted internal brute force attack makes designated changes to an exposed password so that a user who reuses a base password, which may be vulnerable to a targeted attack, can be identified when the exposed password does not exactly match a user's password in the domain but they share a common basis. For example, designated changes may specify that a character representing a numeral be replaced with a different numeral character (e.g., "1" is substituted by "2", then "3", etc.); letter characters have their case adjusted, wherein majuscule letters are swapped for minuscule letters and vice versa (e.g., "A" is substituted for "a", "b" is substituted for "B"); special characters are cycled through (e.g., a password requiring the use of at least one special character can replace the special character of "!" with "@", "#", "$", etc.); accents on letter characters are adjusted (e.g., "u" for "û", "ü", etc.); cross-script substitutions are made (e.g., "b" for "β" or "ẞ"); and letter/numeral substitutions are made based on known similar or suggestive shapes of the characters (e.g., "O" for "o" or "○"; "3" for "e" or "E"; "4" for "a" or "A"; and vice versa). To illustrate, the password of "password#1" may have minor variations tried to log into the associated account including, but not limited to: "Password#1", "PASSWORD#1", "password#2", "password&1", "p4SswOrD$7", etc. An administrator may set how many variations and what variations are to be applied when attempting to see if a user is using a common base for a password internally and a password externally that has been exposed.

It is determined at DECISION 350 whether the login attempts for a given account were successful. When the login attempts were not successful, method 300 proceeds to OPERATION 370 where an alert is generated. When one of the login attempts was successful, method 300 proceeds to OPERATION 360 where the given account is secured.

When an account is secured at OPERATION 360, various security measures may be taken. For example, an account may be locked from access from external ASDs 110 (e.g., an on premises login may be required until a password can be changed), access to secure files or systems may be limited from the account, the user may be contacted to change the password, the authentication server 130 may automatically reset the user's password, multifactor authentication may be required, etc. Method 300 may then proceed to OPERATION 370 and/or repeat as necessary from OPERATION 320 to actively verify whether additional identifiers in the intelligence feed 180 put other accounts at risk.

When an alert is generated at OPERATION 370, an administrator or the user whose account the compromised identifier resolved into may be contacted. The alert may be transmitted as an email, a text message, a pager signal, a network message, an automated telephone message, or the like so that other accounts used by the user outside of the network 170 may be secured by the user or additional security measures may be taken in relation to the exposed credentials. Method 300 may then conclude or repeat as necessary from OPERATION 320 to actively verify whether additional identifiers in the intelligence feed 180 put other accounts at risk.

FIG. 4 is a flowchart showing general stages involved in an example method 400 for passively verifying user credentials present in observed network traffic to identify an attack using exposed credentials. Method 400 begins at OPERATION 410, where an intelligence feed 180 is received. The intelligence feed 180 includes credentials from a domain that have been exposed (e.g., in a data breach) and may be available to malicious parties for use in an attack. The credentials include one or more user identifiers (e.g., an email address, an account name, a personal name, a social security number) and an exposed password, but in various aspects may also include additional information (e.g., security questions and their answers). Once an intelligence feed 180 has been initially received, method 400 may subsequently begin at OPERATION 420 and use an intelligence feed 180 that was received from a prior execution of method 400.

At OPERATION 420, an authentication request destined for an authentication server 130 is received by a gateway 120 of the network 170. In various aspects, the SDC 140 of the network passively monitors the authentication requests received (e.g., via port forwarding) and attempts at OPERATION 430 to use one or more passwords from the intelligence feed 180 to attempt to decrypt an encrypted portion of the authentication request. The authentication request will include a username (a requested username) and an encrypted portion which is encrypted according to or based on a password.

In various aspects, more than one exposed password may be applied to each authentication attempt to try to decrypt its encrypted portions. For example, a key array may be generated from the passwords in the intelligence feed 180 to create n keys to attempt against the encrypted portion of each authentication request. In various aspects, the array may be built in advance of the authentication attempt or may be built (or added to) on-the-fly as the SDC 140 checks various authentication attempts with various potential passwords. For example, when the intelligence feed 180 provides more than n passwords, the key array may rotate new passwords into the n-key array to replace other passwords. Depending on the authorization protocol used, keys in the key array may be passwords, a hash of the passwords, or a hash of a different value hashed according to the password.

The key array is applied to the encrypted portion of an authentication request received at OPERATION 420. The keys comprising the key array are applied in series to the encrypted portion to try to decrypt that portion. The portion in its potentially decrypted state is used in DECISION 440 and DECISION 450 to determine whether compromised credentials for the network 170 were used in the authentication request and whether the authorization granted access to the network 170, respectively. When the portion as "decrypted" by the compromised password applied in OPERATION 430 is determined to have been actually decrypted with an exposed password then method 400 proceeds to DECISION 450 as it is determined that the credentials have been exposed, otherwise method 400 may conclude, or repeat from OPERATION 430 with a different password from the intelligence feed 180. The portion is determined to have been decrypted when, according to the authentication protocol used, a logical result is produced by the attempted password from the intelligence feed 180. For example, when the protocol, such as Kerberos, uses an encrypted timestamp, if the decrypted version yields a dataset formatted as a timestamp that would be a potential time in which an authentication request could have been sent (e.g., accounting for network latency and differences in system clock synchronization, the decrypted timestamp correlates to a time received for the message), the portion is determined to have been decrypted with compromised credentials.

At DECISION 450 it is determined whether the authorization attempt using compromised credentials successfully granted access to the network 170. When authorization was successful, method 400 proceeds to OPERATION 460 to secure the account to which authorization was granted, and when authorization failed, method 400 proceeds to OPERATION 470 to secure the network against a potential attack.

At OPERATION 460 the account corresponding to the exposed credentials is secured. Because the authorization request may have been sent from a legitimate user who, unbeknownst to the user, has had credentials exposed from another network securing the account includes, but is not limited to the account-specific security measures of: alerting an administrator or the user to change a password, requiring an additional authentication factor (e.g., a secret question/answer challenge, issuing an access token to a secondary device), logging the user out of the account, automatically resetting the password for the account, limiting access to sensitive files/locations in the network, preventing remote access from the account, locking the account, and flagging the account for administrative review. Method 400 then proceeds to OPERATION 470.

The network 170 is secured against a possible attack at OPERATION 470. In various aspects, OPERATION 470 is executed in response to an authentication request using compromised credentials that either do or do not successfully grant access to the network, and the network-specific security measures that may be taken include, but are not limited to: implementing an ACL (e.g., blacklisting the IP address from which the authentication request was sent, activating a whitelist to allow authentication requests only from trusted IP addresses), blocking a port to which the authentication request is addressed, migrating a machine within network or otherwise changing its IP address, requiring multifactor authentication, and implementing additional packet screening techniques. Method 400 may conclude after OPERATION 470.

Intelligence Feed 180

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
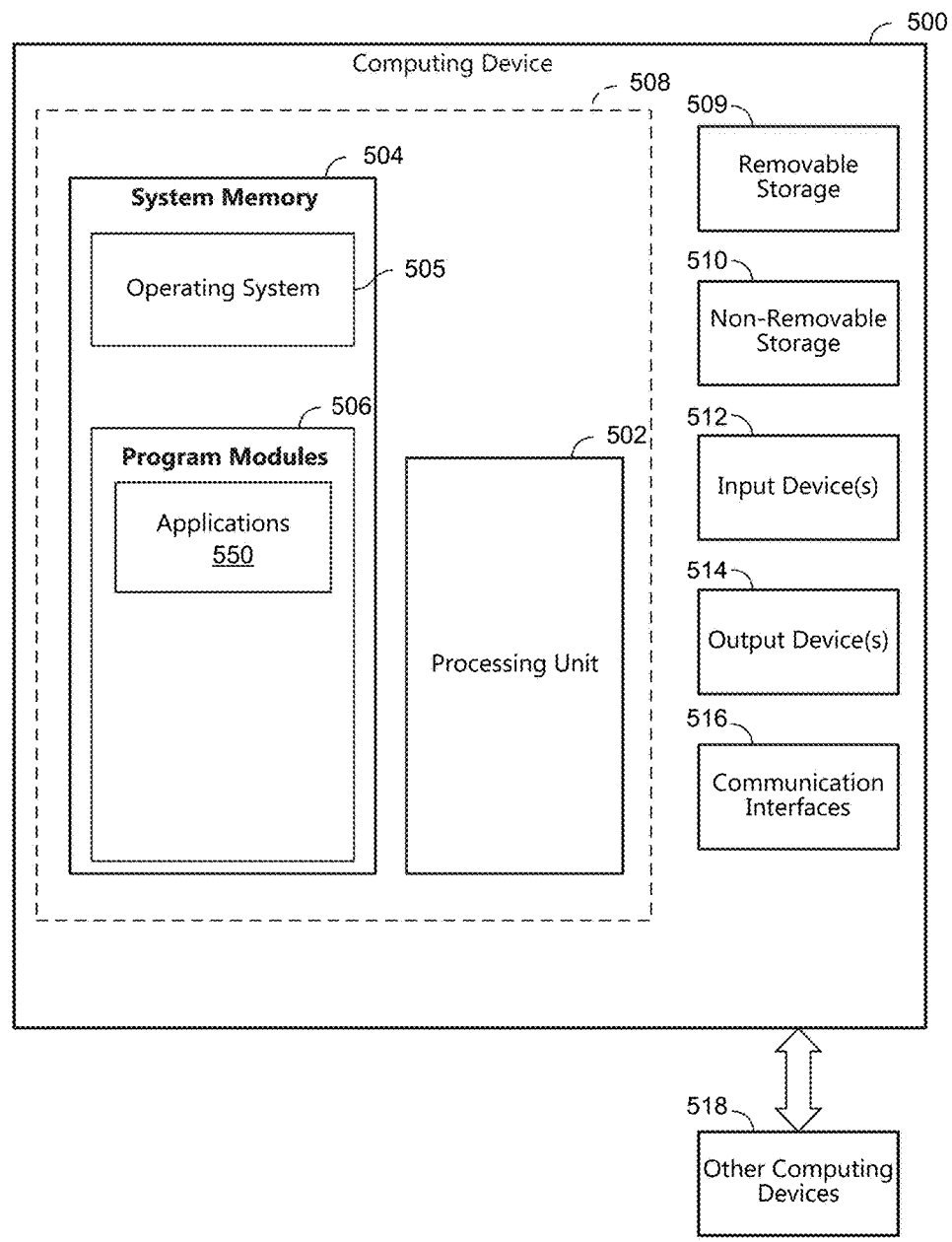
FIG. 5 is a block diagram illustrating physical components of a computing device with which examples may be practiced.
Figure 6A:
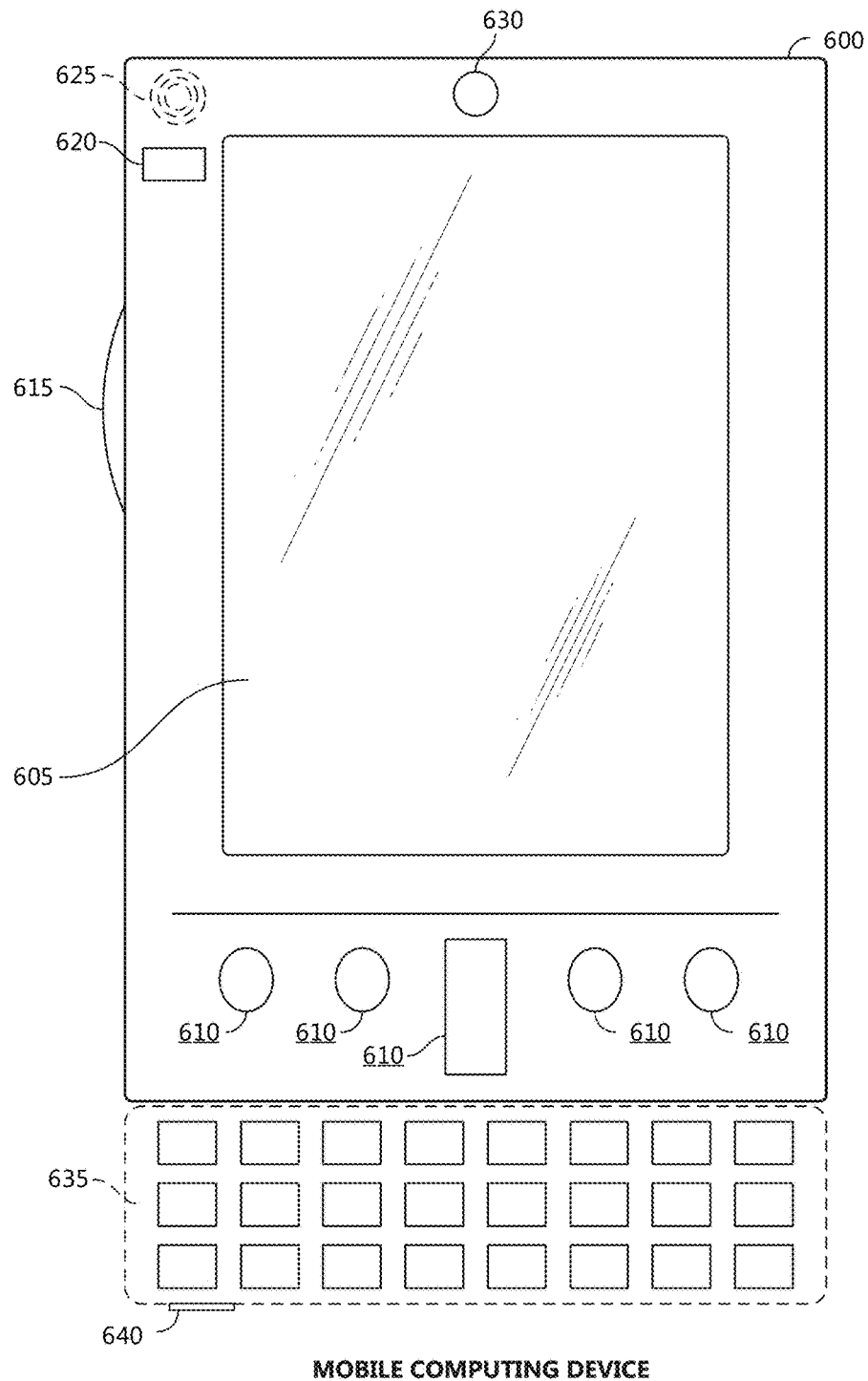
FIGS. 6A and 6B are block diagrams of a mobile computing device with which aspects may be practiced.
Figure 6B:
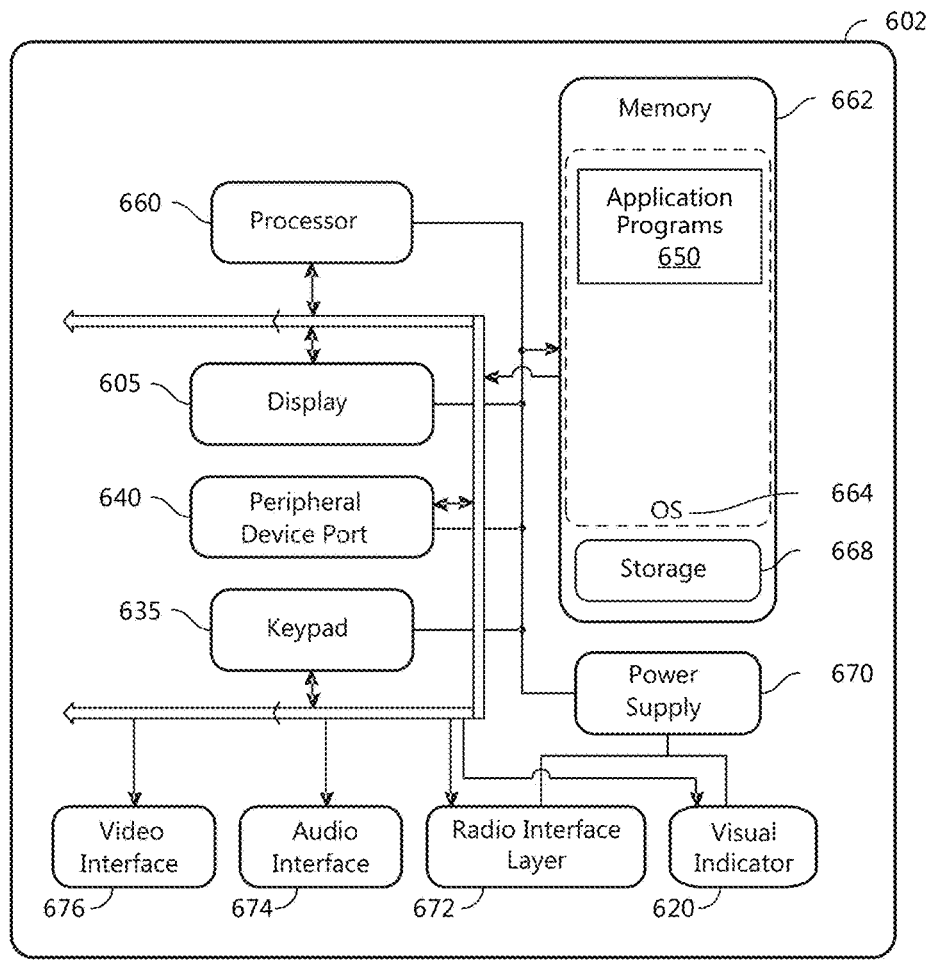

FIGS. 5, 6A, and 6B and the associated descriptions provide a discussion of a variety of operating environments in which examples are practiced. However, the devices and systems illustrated and discussed with respect to FIGS. 5, 6A, and 6B are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes a SDC controller to enable a software application 550 to employ the teachings of the present disclosure via stored instructions. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 perform processes including, but not limited to, one or more of the stages of the methods 300 and 400 illustrated in FIGS. 3 and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication interfaces 516 allowing communications with other computing devices 518. Examples of suitable communication interfaces 516 include, but are not limited to: radio frequency (RF) transmitter, receiver, and/or transceiver circuitry; universal serial bus (USB) ports, parallel and/or serial ports, and Ethernet ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced or may be used as an ASD 110. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, client used to access the network is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for protecting a first network from an attack, the method comprising:
    requesting by a security device center within a first network an intelligence feed from an intelligence service, the intelligence feed comprising an exposed username and an exposed password associated with the exposed username, wherein the exposed username and the exposed password were exposed from a second network;
    determining by the security device center that the exposed username resolves in the first network to a local username;
    based on determining that the exposed username resolves in the first network to the local username, attempting by the security device center to log into the first network using the local username and the exposed password;
    receiving by the security device center an authorization request to access the first network, wherein the authorization request comprising an email address and an encrypted portion;
    determining by the security device center that the email address resolves in the first network to the local username;
    based on determining that the exposed username resolves in the first network to the local username, attempting by the security device center to decrypt the encrypted portion with the exposed password; and
    based on determining the security device center successfully logged into the first network using the local username and the exposed password and determining that the encrypted portion is successfully decrypted with the exposed password, signaling by the security device to the authentication server to secure an account associated with the local username in the first network.

2. The method of claim 1, wherein determining whether the exposed username resolves in the first network to the local username further comprises:
    querying an active directory for the first network with an extra-domain username to return an intra-domain username,
    determining, based on the query returning the intra-domain intra-domain username, that the intra-domain username returned is the local username; and
    determining, based on the query not returning the intra-domain username, that the exposed username does not resolve into the local username; and
    based on determining that the exposed username does not resolve into the local username, signaling by the security device to a gateway deployed in the first network to secure the first network.

3. The method of claim 1, wherein the credentials are received in response to a credential update on the authentication server.

4. The method of claim 1, wherein the encrypted portion is determined to have been successfully decrypted based on applying the exposed password to the encrypted portion yielding a field formatted as a timestamp.

5. The method of claim 1, wherein the intelligence feed is received according to a pull model in response to the security device center transmitting a request to an intelligence service hosted externally to the first network, wherein the intelligence service is operative to gather the exposed username and the exposed password.

6. The method of claim 1, wherein the intelligence feed is received according to a push model, wherein the intelligence feed is received on a periodic basis from an intelligence service hosted externally to the first network.

7. The method of claim 1, wherein the account associated with the local username in the first network is secured by applying a network specific security procedure.

8. The method of claim 7, wherein the network-specific security procedure comprises at least one of the following:
    implementing an access control list;
    blocking a port; and
    requiring multifactor authentication to access a local account associated with the local username.

9. The method of claim 7, wherein the account-specific security procedure comprises at least one of the following:
    locking a local account associated with the local username from access;
    restricting access to sensitive files and systems from the local username;
    resetting a local password associated with the local username;
    contacting a user associated with the local username to change the local password; and
    flagging the local username for a manual review.

10. An apparatus for protecting a first network from an attack, the apparatus comprising:
    at least one processor device; and
    a memory, operatively connected to the at least one processor, storing instructions, which when executed, cause the at least one processor device to:
    request by a security device center within a first network an intelligence feed from an intelligence service, the intelligence feed comprising an exposed username and an exposed password associated with the exposed username, wherein the exposed username and the exposed password were exposed from a second network;
    determine by the security device center that the exposed username resolves in the first network to a local username;
    based on determining that the exposed username resolves in the first network to the local username, attempt by the security device center to log into the first network using the local username and the exposed password;

receive by the security device center an authorization request to access the first network, wherein the authorization request comprising an email address and an encrypted portion;

determine by the security device center that the email address resolves in the first network to the local username;

based on determining that the exposed username resolves in the first network to the local username, attempt by the security device center to decrypt the encrypted portion with the exposed password; and based on determining the security device center successfully logged into the first network using the local username and the exposed password and determining that the encrypted portion is successfully decrypted with the exposed password, signal by the security device to the authentication server to secure an account associated with the local username in the first network.

11. The apparatus of claim 10, wherein the apparatus comprises a security device center within the first network.

12. The apparatus of claim 10, wherein the account associated with the local username in the first network is secured by applying a network specific security procedure.

13. The apparatus of claim 12, wherein the network-specific security procedure comprises at least one of the following:
   implementing an access control list;
   blocking a port; and
   requiring multifactor authentication to access a local account associated with the local username.

14. The apparatus of claim 10, wherein the intelligence feed is received according to a push model, wherein the intelligence feed is received on a periodic basis from an intelligence service hosted externally to the first network.

15. The apparatus of claim 10, wherein the account associated with the local username in the first network is secured by applying a network specific security procedure.

16. A computer-readable storage medium comprising computer-executable instructions which, when executed by a computing device, will cause the computing device to perform a method comprising:

requesting by a security device center within a first network an intelligence feed from an intelligence service, the intelligence feed comprising an exposed username and an exposed password associated with the exposed username, wherein the exposed username and the exposed password were exposed from a second network;

determining by the security device center that the exposed username resolves in the first network to a local username;

based on determining that the exposed username resolves in the first network to the local username, attempting by the security device center to log into the first network using the local username and the exposed password;

receiving by the security device center an authorization request to access the first network, wherein the authorization request comprising an email address and an encrypted portion;

determining by the security device center that the email address resolves in the first network to the local username;

based on determining that the exposed username resolves in the first network to the local username, attempting by the security device center to decrypt the encrypted portion with the exposed password; and based on determining the security device center successfully logged into the first network using the local username and the exposed password and determining that the encrypted portion is successfully decrypted with the exposed password, signaling by the security device to the authentication server to secure an account associated with the local username in the first network.

17. The computer-readable storage medium of claim 16, wherein the account associated with the local username in the first network is secured by applying a network specific security procedure.

18. The computer-readable storage medium of claim 17, wherein the network-specific security procedure comprises at least one of the following:
   implementing an access control list;
   blocking a port; and
   requiring multifactor authentication to access a local account associated with the local username.

* * * * *

UNITED STATES PATENT AND TRADEMARK OFFICE
CERTIFICATE OF CORRECTION

PATENT NO. : 10,129,298 B2  
APPLICATION NO. : 15/199880  
DATED : November 13, 2018  
INVENTOR(S) : Grady et al.

Page 1 of 1

It is certified that error appears in the above-identified patent and that said Letters Patent is hereby corrected as shown below:

In the Claims

Column 18, Lines 2-3, Claim 2: "intra-domain username," should read --intra-domain username;--

Column 18, Lines 4-6, Claim 2: "determining, based on the query returning the infra-domain intra-domain username, that the intra-domain username returned is the local username; and" should read --determining, based on the query returning the intra-domain username, that the intra-domain username returned is the local username;--

Signed and Sealed this  
Fourteenth Day of May, 2019

Andrei Iancu  
*Director of the United States Patent and Trademark Office*